United States Patent
Meissner

(10) Patent No.: US 6,886,499 B2
(45) Date of Patent: May 3, 2005

(54) RETRACTABLE LEASH FOR ANIMALS

(75) Inventor: Eleonore Meissner, Saarbrucken (DE)

(73) Assignee: Geniflex Inc., Great Falls, VA (US)

( * ) Notice: Subject to any disclaimer, the term of this patent is extended or adjusted under 35 U.S.C. 154(b) by 0 days.

(21) Appl. No.: 10/747,350

(22) Filed: Dec. 29, 2003

(65) Prior Publication Data

US 2004/0154557 A1 Aug. 12, 2004

Related U.S. Application Data

(63) Continuation of application No. PCT/DE02/02333, filed on Jun. 27, 2002.

(30) Foreign Application Priority Data

Jun. 28, 2001 (DE) .......................................... 201 10 526

(51) Int. Cl.$^7$ .......................... A01K 27/00; B65H 75/34
(52) U.S. Cl. .......................... 119/796; 119/794; 119/789
(58) Field of Search ................................ 119/796, 797, 119/798, 794, 786, 787, 788, 789; 43/21.2; 242/442

(56) References Cited

U.S. PATENT DOCUMENTS

| | | | |
|---|---|---|---|
| 2,776,644 A | 1/1957 | Fontaine | |
| 3,088,438 A | 5/1963 | Olophant | |
| 5,022,351 A | 6/1991 | Daniels | |
| 5,558,044 A | * 9/1996 | Nasser et al. ............... | 119/796 |
| 5,887,550 A | * 3/1999 | Levine et al. ............... | 119/796 |
| 5,983,836 A | 11/1999 | Chavez | |
| 6,003,472 A | 12/1999 | Matt et al. | |
| 6,003,474 A | * 12/1999 | Slater et al. ................ | 119/859 |
| 6,024,054 A | * 2/2000 | Matt et al. .................. | 119/796 |
| 6,148,773 A | * 11/2000 | Bogdahn .................... | 119/796 |
| 6,240,881 B1 | 6/2001 | Edwards et al. | |
| 6,289,849 B1 | * 9/2001 | Macedo et al. ............. | 119/796 |
| 6,474,270 B1 | * 11/2002 | Imes .......................... | 119/796 |
| 6,688,260 B2 | * 2/2004 | Morrison .................... | 119/796 |
| 2003/0145803 A1 | * 8/2003 | Muller ........................ | 119/796 |

FOREIGN PATENT DOCUMENTS

| | | |
|---|---|---|
| DE | 30 40 281 C2 | 7/1982 |
| DE | 85 17 201 U | 9/1985 |
| DE | 199 38 591 A | 3/2000 |
| DE | 200 00 789 U | 3/2000 |
| FR | 2 153 610 A | 5/1973 |
| FR | 2 786 364 A | 6/2000 |

* cited by examiner

Primary Examiner—Yvonne R. Abbott
(74) Attorney, Agent, or Firm—Henry M. Feiereisen; Ursula B. Day

(57) ABSTRACT

A retractable leash for animals includes a housing in which the remaining length of a leash exiting the housing can be taken up, and can be arrested by an actuating mechanism and that the housing is configured for the attachment of additional elements for practical functions such as a flashlight and/or for connecting it to additional retractable leashes and similar.

15 Claims, 7 Drawing Sheets

RETRACTABLE LEASH FOR ANIMALS

CROSS-REFERENCES TO RELATED APPLICATIONS

This application is a continuation of prior filed copending PCT International application no. PCT/DE02/02333, filed Jun. 27, 2002.

This application claims the priority of German Patent Application Serial No. 201 10 526.8, filed Jun. 28, 2001, the subject matter of which is incorporated herein by reference.

BACKGROUND OF THE INVENTION

The present invention relates to a leash for animals and specifically a retractable leash for animals, and which includes a housing in which the remaining length of a leash exiting the housing can be taken up, and which can be stopped by means of actuating mechanisms.

Compared to conventional leashes, retractable leashes have the advantage that they automatically wind up excess leash on a spring-biased reel. For the user walking the animal, retractable leashes of this kind are generally equipped with a fixed-size grip that is integral with the housing. The advantage of a combi-design of this kind is that it permits a very simple production process. The first disadvantage, however, is that different users have different-sized hands that do not all fit into a single-sized grip. Optimal operation and handling of such a leash can accordingly not be guaranteed. This problem is exacerbated by the second disadvantage, namely that the size of the retractable leash, and hence also the size of the grip, increases with the size of the animal.

If, for example, a person with a dainty hand uses a retractable leash for a large animal, the grip will be too large, since the pulling force on the leash and the direction of pull will cause the user's hand to slip automatically to the lower end of the grip. If this happens, the user's thumb can no longer reach the actuating buttons at the top end of the grip. In dangerous situations it is thus almost impossible to keep an animal under control.

The opposite situation occurs, for example, when a person with a large hand uses a retractable leash for a small animal. In this case, the grip is too small. The thumb of the hand holding the leash can admittedly always reach the actuating buttons at the top of the grip, but since only two or three fingers fit into the grip, walking an animal on the leash becomes very uncomfortable with time.

Since one and the same person can only have one hand size—unless he or she wears gloves in winter, thus altering the "hand size"—the combination of these disadvantages means that a user hardly ever has the ideal retractable leash.

One exception here is retractable leashes with such a small housing that it fits into the palm of users with medium-to-large hands, and therefore does not have a grip. A construction of this kind is described, for example, in the DE 30 40 281. On account of their design, these leashes have only a very limited range and cannot accommodate other fixed mountings.

Another exception is leashes designed to give an animal controlled freedom of movement. The housing has an eye that can be hung on a hook, allowing the leash to be attached to an object. The disadvantage of these leashes is that the extension length of the leash cannot be set, and that no other mountings can be accommodated. Such leashes can therefore be used only for this one purpose.

It would therefore be desirable and advantageous to provide an improved leash for animals to obviate prior art shortcomings and to provide a useful leash with improved functions and additional uses.

SUMMARY OF THE INVENTION

According to one aspect of the present invention, an animal leash with improved properties fulfills various functions and is provided with a housing with means for the attachment of additional elements.

The retractable leash for animals includes a housing in which the remaining length of a leash exiting the housing can be taken up, and stopped by means of actuating mechanisms, and wherein the housing is provided with means for the attachment of additional elements.

Examples of such additional elements include a separate grip of a certain size and/or design. This would ensure that, irrespective of who is using the retractable leash and of the situation, the user's hand fits perfectly and the leash can be operated comfortably and safely. By means of a another additional element, the animal can easily be secured to another object—for example, a railing at the shops or a post in the garden. Additional elements can be exchanged in a few seconds.

The present invention resolves prior art problems by providing an attachment means for additional elements. The attachment means includes a groove. A groove of this kind ensures the easy and safe attachment of an additional element.

It is expedient to provide means for locking and releasing the additional elements.

The scope of the invention provides for the additional elements to include a grip.

The scope of the invention also provides for the additional elements to include means for releasably attaching the retractable leash to another object.

It is expedient to equip the grip with a flashlight.

It is furthermore expedient to equip the grip with an acoustic or optical signal generator.

It is also useful for the grip to contain a tear-gas device.

Another useful feature consists in providing the grip with an infrared or radio signal transmission system.

Also, it is useful to provide the grip with means for connecting it to additional retractable leashes.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
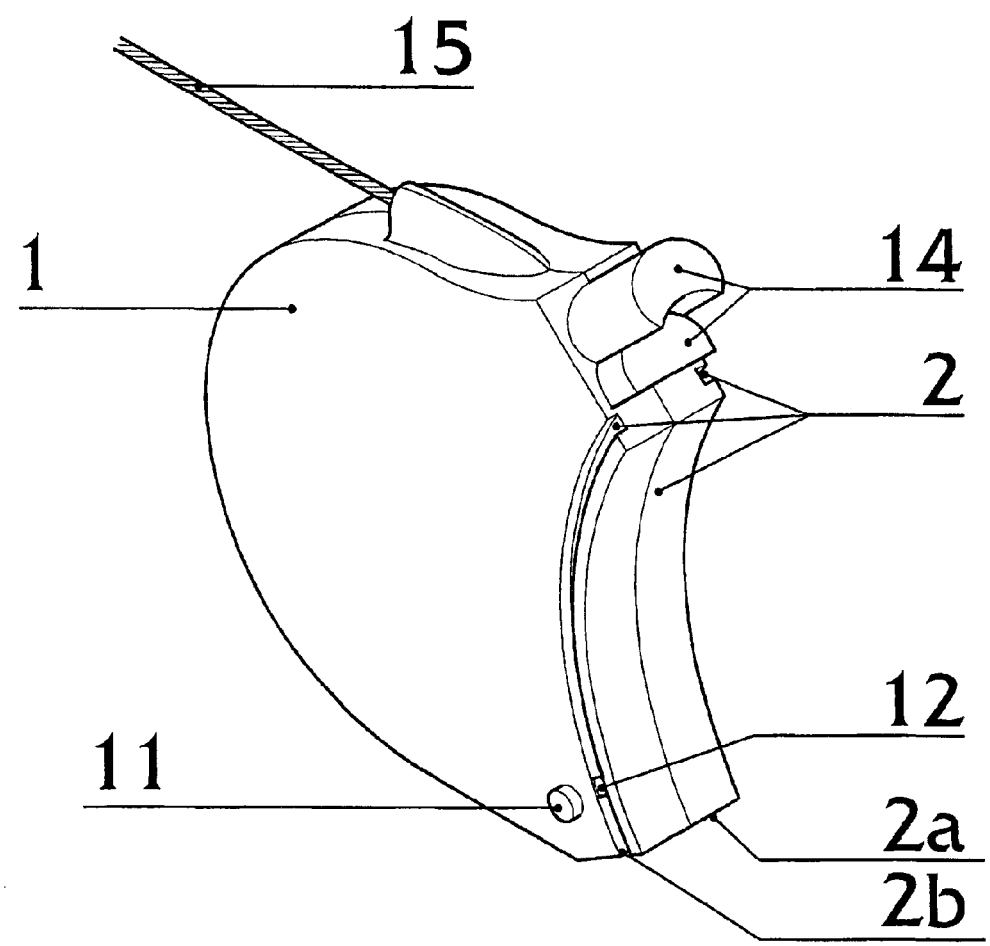
FIG. 1 is a perspective view of a retractable leash housing with a mounting according to the present invention.
Figure 1A:
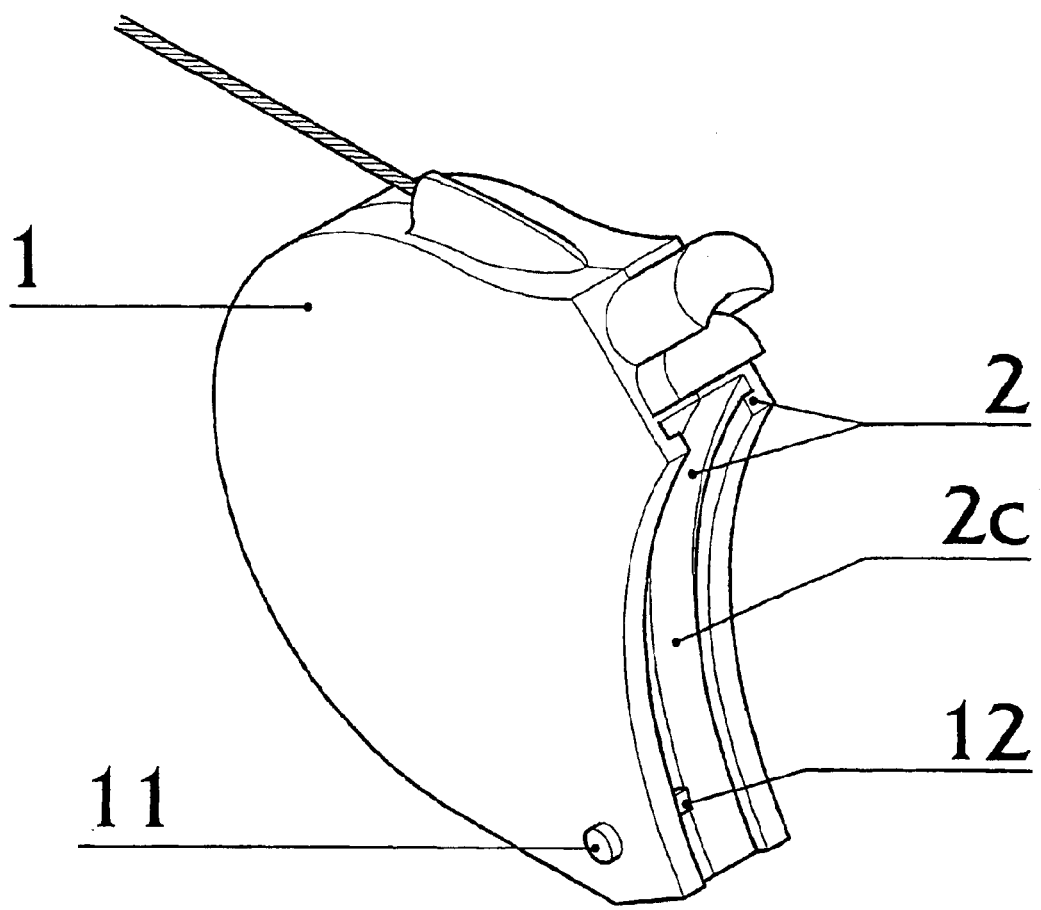
FIG. 1a shows a perspective view of a retractable leash housing with an alternative mounting according to the invention.

Throughout all the Figures, same or corresponding elements are generally indicated by same reference numerals.

Turning now to the drawing, and in particular to FIG. 1, there is shown a housing of the retractable leash 1 which is preferably provided at the rear with a mounting 2 for corresponding additional elements 3a, 3b, 5, 6.

Figure 2:
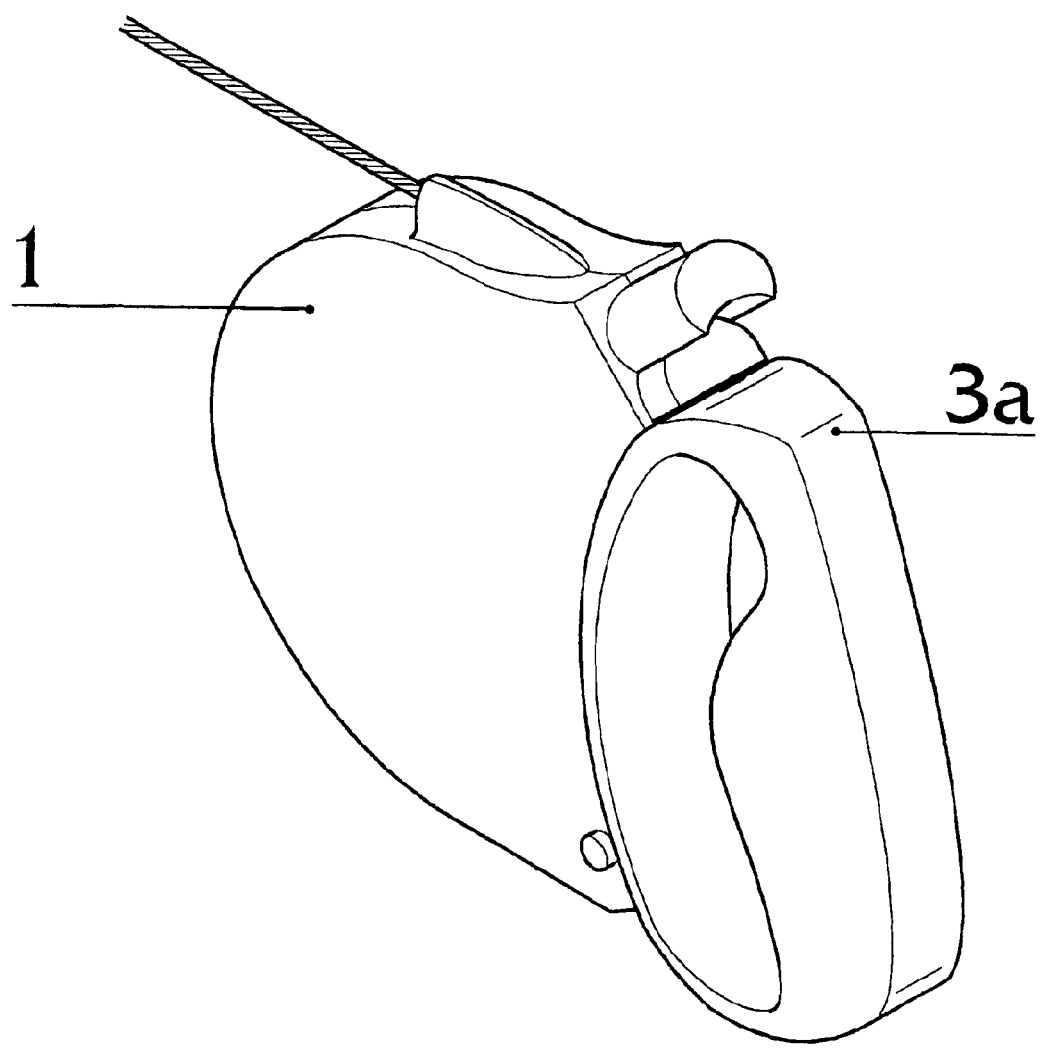
FIG. 2 shows a perspective view of a retractable leash housing with a medium-sized grip.
Figure 3:
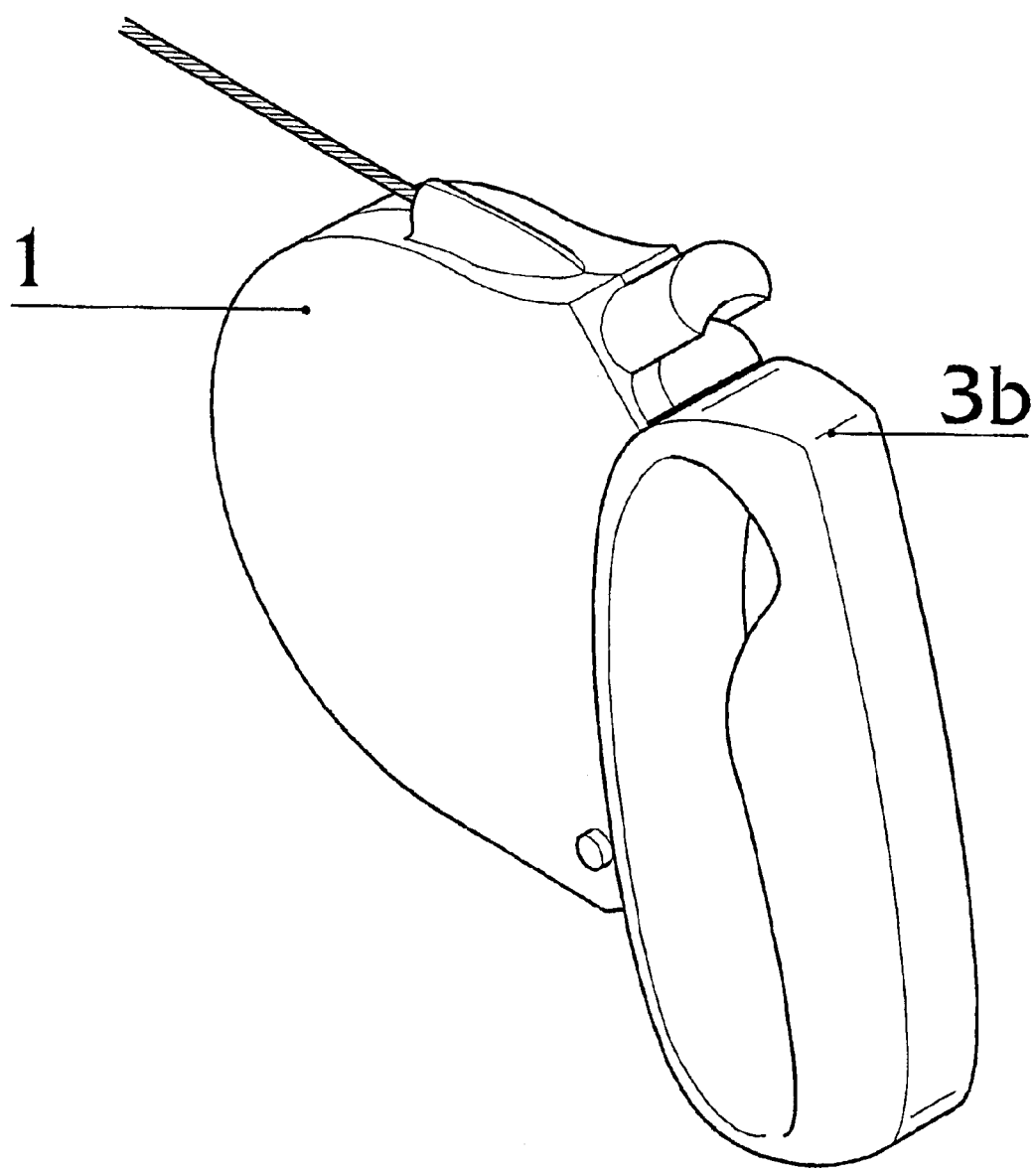
FIG. 3 shows a perspective view of a retractable leash housing with a large grip.
Figure 4:
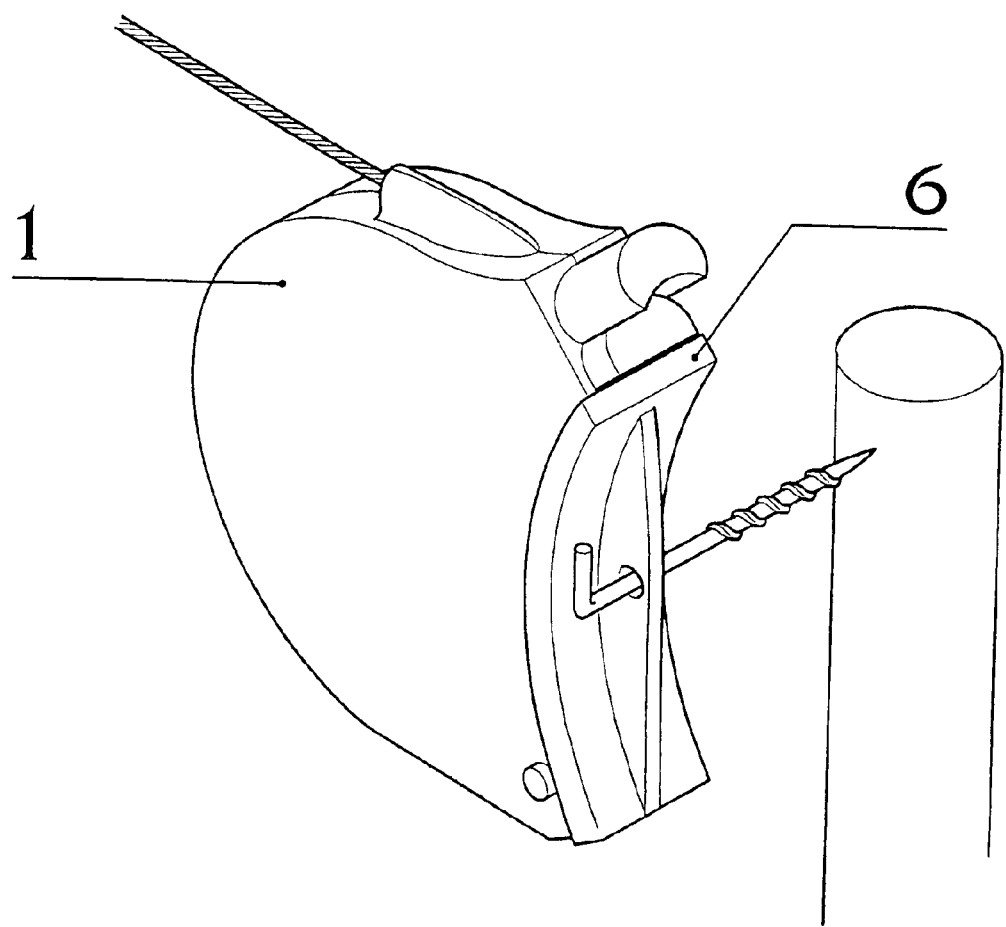
FIG. 4 shows a perspective view of a retractable leash housing with an attachment device.

The mounting (2) is executed in the form of a uniform-radius groove (2a, 2b) on both sides. Alternatively, the mounting (2) can be executed in the form of a central, uniform-radius groove (2c). The uniform radius ensures that the maximum possible contact area is available for transmitting tensile forces between the retractable leash housing (1) and additional elements such as grip (3a, 3b, 5) or attachment device (6). In FIG. 2 and FIG. 3, different-sized grips (3a, 3b, 5) are shown as additional elements. FIG. 4 shows, as a development of the retractable leash (1), a device for temporary attachment of the retractable leash (1) to a post by means of a screw hook. Other means for attaching the retractable leash (1) to an object are also conceivable, for example a plate with a swivel joint for screwing to a wall. To connect the retractable leash (1) with an additional element (3a, 3b, 5, 6), this is preferably inserted from above into the grooves (2a, 2b) on each side, and pushed down until the locking device (12) engages in a flank—running in the grooves (2a, 2b)—of the additional element (3a, 3b, 5, 6). To release the connection between the retractable leash (1) and the additional element (3a, 3b, 5, 6), the unlock button (11) is pressed, and the additional element (3a, 3b, 5, 6) pulled upwards out of the grooves (2a, 2b) on each side.

The retractable leash according to the invention thus permits the problem-free exchange of different additional elements for the retractable leash. The same retractable leash can be used, for example, both to allow an animal controlled freedom of movement within a certain area and, seconds later, for a walk with its owner or anyone else. Another advantage of the retractable leash according to the invention is that, unlike conventional retractable leashes equipped with an eye for attaching the leash to another object, the length to which the animal can freely extend the leash can be set.

Figure 5:
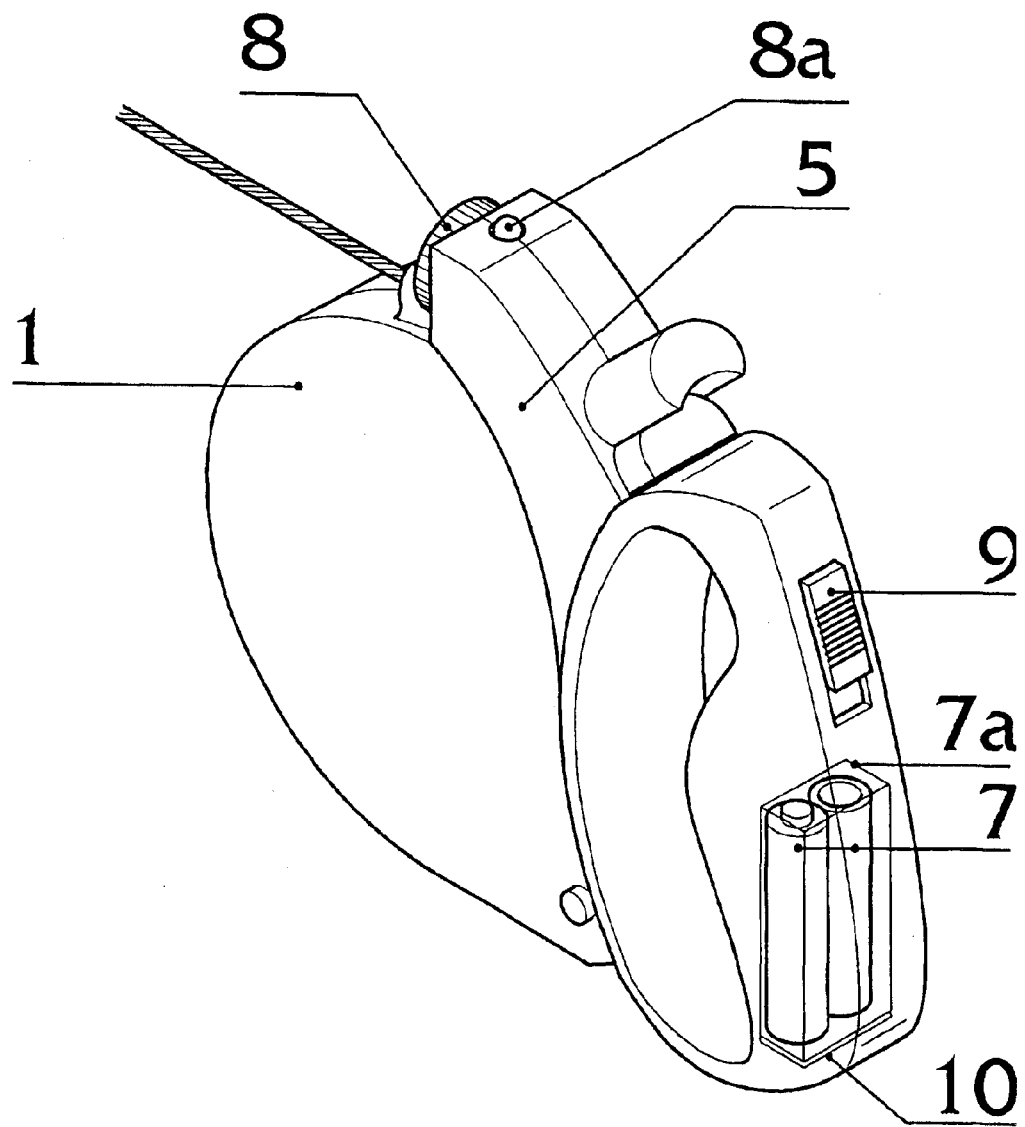
FIG. 5 shows a perspective view of a retractable leash housing with a grip and integrated flashlight.

A development of the retractable leash (1) of the invention with its additional elements is exemplified in FIG. 5. As is apparent, the attachable grip (3a, 3b) can be supplemented by a flashlight (8), for example. In this case, the batteries (7) needed to power the flashlight (8) can be accommodated in the lower part of the grip (5) by opening the flap (10). The user can switch the flashlight (8) on and off by actuating the switch (9) with the thumb of his or her holding hand. In a similar manner, the grip (3a, 3b, 5) can be supplemented by a coin compartment, e.g. in the form of a small box in the empty battery compartment (7a) (grip 3a, 3b) or of a snap-closure compartment—as is familiar in the automotive accessories sector—above the flashlight (8) (grip 5). A signaling lamp (8a), which is likewise actuated by means of the switch (9), can also be installed above the flashlight (8) in the grip (5). This serves for easier recognition of the person walking the animal at night. Integrating a tear-gas cartridge or an acoustic signal generator in the grip (3a, 3b, 5) to ward off aggressive animals or persons is also conceivable. Last but not least, the integration of an infrared or radio signal transmission system for controlling a receiver attached to the animal for training purposes, or as an access-control system for a house or building and/or a yard, can also be a useful addition to a grip (3a, 3b, 5).

A further advantage of the retractable leash (1) of the invention with its additional elements is that by virtue of the construction, a grip (3a, 3b 5), for example, having at least one or more of the above-described supplementary devices, can also be used as a separate system without the retractable leash (1). By exploiting such synergy effects, the usefulness of the overall system of the invention can be increased significantly. In the end, this will make the system extremely cost effective and hence lead to high market acceptance.

Figure 6:
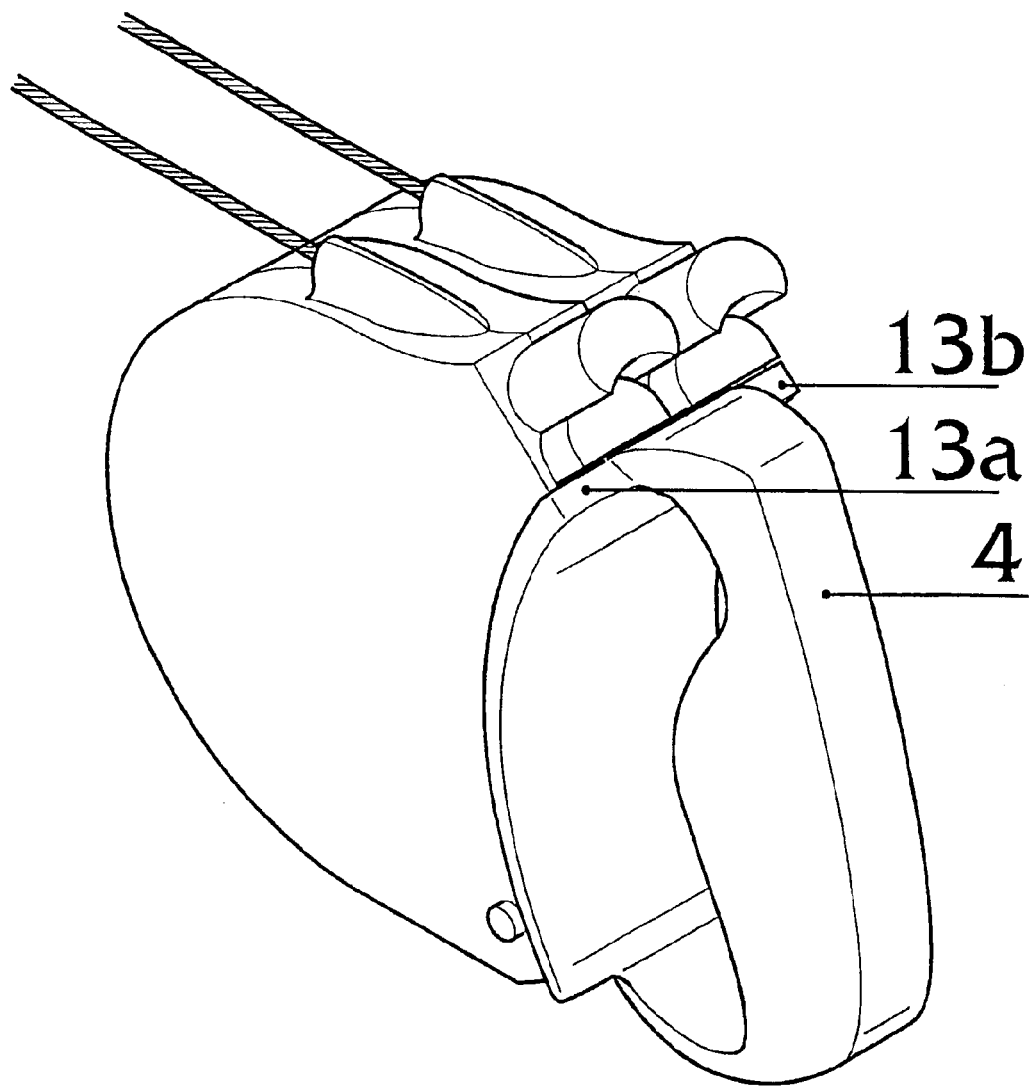
FIG. 6 shows a perspective view of a grip with a mounting for two retractable leashes.

FIG. 6 shows a special version of a grip (3a, 3b, 5). The grip (4) has two mountings (13a, 13b), each of which connects to one retractable leash (1). This special form of grip permits the safe and ergonomic control of two animals with just one hand. Since the part of the grip (4) that is actually grasped is located centrally between the mountings (13a, 13b), the user can easily actuate the buttons (14) of both the left and the right retractable leash (1) with the thumb of his or her holding hand. This is extremely useful when, for example, two animals are being walked in the rain. Both animals can be controlled safely with one hand, while the other hand is free to hold an umbrella. A grip (4) of this kind can also be equipped with the aforementioned additional elements, such as a flashlight, tear-gas cartridge, signal generator, etc.

While the invention has been illustrated and described as embodied in a retractable leash for animals, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A retractable leash assembly for animals, comprising a housing for taking up a remaining length of the leash extending from the housing, and actuating mechanisms for arresting the leash extended at a predetermined length, and
    a grip handle removably connected to the housing, wherein the handle is oriented at the housing so that the actuating mechanisms can be operated by a hand holding the grip, wherein the housing and the grip handle are configured for mutual engagement for easily connecting the handle to and releasing the handle from the housing.

2. The retractable leash assembly of claim 1, wherein the means for connecting the grip handle the is configured as a groove for receiving a corresponding connecting means at the grip handle.

3. The retractable leash assembly of claim 1, further comprising means for locking and releasing additional elements.

4. The retractable leash according to claim 3, wherein the additional elements are integrated into the grip.

5. The retractable leash assembly of claim 4, wherein the grip is equipped with a flashlight.

6. The retractable leash assembly of claim 4, wherein the grip is equipped with an acoustic or optical signal generator.

7. The retractable leash assembly of claim 4, wherein the grip contains a tear-gas device.

8. The retractable leash assembly of claim 4, wherein the grip is equipped with an infrared or radio signal transmission system.

9. The retractable leash of claim 3, wherein the additional elements include means for releasably attaching the retractable leash to a pole.

10. A retractable leash assembly for animals as in claim 1, wherein the housing is configured as a twin housing for two independent leashes each extending from one of the twin housing, and including an actuating mechanism for each of the leashes and arresting each of the leashes extended at a predetermined length, and a grip handle removably connected to the housing, wherein the handle is oriented so that each of the actuating mechanism can be individually operated by a hand holding the grip.

11. A retractable leash assembly for animals, comprising a housing for taking up a remaining length of the leash extending from the housing, and actuating mechanisms for arresting the leash extended at a predetermined length, and wherein the housing is provided with attachment means for the attachment of elements selected from the group consisting of a grip handle and a device for fastening the assembly to a pole.

12. A retractable leash assembly for animals, comprising a housing for taking up a remaining length of the leash extending from the housing, and actuating mechanisms for arresting the leash extended at a predetermined length, and
   a grip handle removably connected to the housing, wherein the handle is oriented so that the actuating mechanisms can be operated by a hand holding the grip, wherein the housing is provided with a locking system for connecting the handle to and releasing the handle from the housing.

13. The retractable leash assembly of claim 12, wherein the locking system for connecting the grip handle is configured as a flank and groove.

14. The retractable leash assembly of claim 13, wherein the groove is in the form of a two sided uniform-radius groove.

15. The retractable leash assembly of claim 13, wherein the groove is in the form of a central, uniform-radius groove.

* * * * *